Patented Jan. 8, 1952

2,582,147

UNITED STATES PATENT OFFICE 2,582,147

SULFONAMIDE COMPOSITION

Kermit L. Mourer and Lewis E. Harris, Lincoln, Nebr., assignors to Norden Laboratories, Lincoln, Nebr., a corporation of Nebraska No Drawing. Application April 10, 1948,
Serial No. 20,374

12 Claims. (Cl. 167—51.5)

This invention relates to a sulfonamide therapeutic product and method of preparing the same.

Prior to the present invention solutions of sodium salts of sulfonamides have been used for parenteral injections since they are water soluble, however, they are unstable in normal usage after standing. This lack of stability on aging makes the solutions hazardous for parenteral use. Another difficulty is that sodium salt solutions are alkaline and therefore irritating in many parenteral uses. These disadvantages have been overcome in part by use of a sulfonamide aldoside but only a few of the commercially available individual sulfonamides could be prepared as an aldoside having sufficient stability for parenteral uses.

We have discovered that practically any commercially available sulfonamide may be prepared as aldosides of sulfonamides and a highly stable, soluble sulfonamide product obtained by combining a plurality of the commercially available sulfonamides with aldoside linkages through simultaneous reaction with an aldose. Combinations of a variety of two or more commercially available sulfonamides may be used, for example:

Sulfapyridine and sulfathiazole
Sulfapyridine and sulfanilamide
Sulfapyridine and sulfamerazine
Sulfapyridine and sulfaguanidine
Sulfaguanidine and sulfathiazole
Sulfaguanidine and sulfanilamide
Sulfaguanidine and sulfamerazine
Sulfaguanidine and sulfadiazine
Sulfathiazole and sulfanilamide
Sulfathiazole and sulfamerazine
Sulfamethazine and sulfapyridine
Sulfamethazine and sulfathiazole The aldose may comprise any one of the following:

Xylose
d-Arabinose
Rhamnose
Galactose
Maltose
Dextrose

In preparing our product one of the above-mentioned aldoses is added to water. The solution is boiled until the aldose is completely dissolved. The sulfonamide powders are then added to the aldose solution either simultaneously or separately and the entire mixture is continually boiled until solution is effected. We find that the required reaction time to effect combination of the resulting aldosides of the sulfonamides is less than when only one sulfonamide is being combined with an aldose. Water is then added to the finished solution to bring the final volume to the desired amount. The hydrogen ion concentration of the solution is then adjusted to the desired pH value.

As one specific example, five hundred grams of dextrose is added to two hundred cc. boiling water and the boiling continued until the dextrose is completely dissolved. Twenty-five grams of sulfapyridine and twenty-five grams of sulfathiazole are added and the entire mixture is continually boiled until solution is effected. Water is then added to bring the final volume to one liter of finished solution. The pH value of the solution is nearly neutral or can be easily adjusted to the neutral point or any other desired pH value by usual means. The resulting solution has exceptional stability and keeping qualities and can be stored satisfactorily over long periods of time.

The above detailed procedure for the production of combined aldosides of sulfonamides is merely an example since it is possible to vary the percentages of the aldose within limits and the percentages of sulfonamidies can also be varied. The percentage of one sulfonamide may be used in some greater or less relation than the percentage of the other sulfonamide without interferring with practicability of the product.

While we have given specific conbinations of sulfonamides, a variety of other combinations may be used.

We have also discovered that with some sulfonamide combinations, the product may be improved by the addition of small amounts of various hydroxides from the class including sodium, ammonium and potassium or various carbonates from the class including sodium, ammonium and potassium.

The hydroxide is added, for example, 0.1 to 0.3 per cent sodium hydroxide while the solution is still hot.

A solution prepared in accordance with invention is of considerable value from a therapeutic point of view since it enables the production of soluble forms of sulfonamides which have stability in solution and can be stored satisfactorily over long periods of time without any precipitation of solids. The solution can therefore be safely used parenterally. The solution is also readily adapted for oral use. Other advantages are that solutions with substantially neutral reaction (pH 7.0) can be prepared which will be less irritating to tissues than the solutions of the common sodium salts of sulfanamides which usually have a value of 9.8–10.5(pH) and are quite alkaline.

What we claim and desire to secure by Letters Patent is:

1. An aqueous therapeutic solution for parenteral injection characterized by stability over a long storage period consisting of a sulfonamide aldoside of the sulfa drug class normally incapable of stability individually in solution throughout said storage period in combination with a relatively stable sulfonamide aldoside of the sulfa drug class.

2. An aqueous therapeutic solution for parenteral injection characterized by stability over a long storage period including a sulfonamide aldoside of the sulfa drug class normally incapable of stability individually in solution throughout said storage period in combination with a relatively stable sulfonamide aldoside of the sulfa drug class, and a carbonate selected from the class which consists of sodium, ammonium and potassium, in amount relative to the other components of the solution so that the pH of the solution is within the range of 7 to 7.6.

3. An aqueous therapeutic solution for parenteral injection characterized by stability over a long storage period consisting of a sulfamerizine aldoside of the sulfa drug class in combination with a relatively stable sulfonamide aldoside of the sulfa drug class.

4. An aqueous therapeutic solution for parenteral injection characterized by stability over a long storage period consisting of a sulfamerazine aldoside of the sulfa drug class in combination with a sulfathiazole aldoside.

5. An aqueous therapeutic solution for parenteral injection characterized by stability over a long storage period including a sulfamerazine aldoside of the sulfa drug class in combination with a sulfathiazole aldoside, and a carbonate selected from the class which consists of sodium, ammonium and potassium, in amount relative to the other components of the solution so that the pH of the solution is within the range of 7 to 7.6.

6. An aqueous therapeutic solution for parenteral injection characterized by stability over a long storage period consisting of a sulfathiazole aldoside in combination with a sulfamerazine aldoside.

7. An aqueous therapeutic solution for parenteral injection characterized by stability over a long storage period including a sulfathiazole aldoside in combination with a sulfamerazine aldoside of the sulfa drug class, and a carbonate selected from the class which consists of sodium, ammonium and potassium, in amount relative to the other components of the solution so that the pH of the solution is within the range of 7 to 7.6.

8. An aqueous therapeutic solution for parenteral injection characterized by stability over a long storage period consisting of a sulfamerazine aldoside in combination with a sulfapyridine aldoside of the sulfa drug class.

9. An aqueous therapeutic solution for parenteral injection characterized by stability over a long storage period consisting of a sulfathiazole aldoside in combination with a sulfapyridine aldoside.

10. An aqueous therapeutic solution for parenteral injection characterized by stability over a long storage period including a sulfamerazine aldoside of the sulfa drug class in combination with a sulfapyridine aldoside of the sulfa drug class, and a carbonate selected from the class which consists of sodium, ammonium and potassium, in amount relative to the other components of the solution so that the pH of the solution is within the range of 7 to 7.6.

11. An aqueous therapeutic solution for parenteral injection characterized by stability over a long storage period including a sulfathiazole aldoside in combination with a sulfapyridine aldoside of the sulfa drug class, and a carbonate selected from the class which consists of sodium, ammonium and potassium, in amount relative to the other components of the solution so that the pH of the solution is within the range of 7 to 7.6.

12. An aqueous therapeutic solution for parenteral injection characterized by stability over a long storage period consisting of a sulfadiazine aldoside in combination with a sulfaguanidine aldoside of the sulfa drug class.

KERMIT L. MOURER.
LEWIS E. HARRIS.

REFERENCES CITED

The following references are of record in the file of this patent:

UNITED STATES PATENTS

| Number | Name | Date |
|---|---|---|
| 2,141,843 | Meyer | Dec. 27, 1938 |
| 2,208,641 | Meyer | July 23, 1940 |
| 2,252,822 | Vogenthaler | Aug. 19, 1941 |
| 2,268,780 | Shonle | Jan. 6, 1942 |

FOREIGN PATENTS

| Number | Country | Date |
|---|---|---|
| 555,865 | Great Britain | Sept. 10, 1943 |

OTHER REFERENCES

J. Amer. Pharm. Assoc., Pharmaceutical Abstracts Section, May 1945, page 137, 167/51.5.

Proc. Soc. Exptl. Biol. and Med., Jan. 1945, pages 11–4, 167/51.5

Proc. Soc. Exptl. Biol. and Med., Apr. 1947, pages 393–399, 167/51.5

New Modern Drugs, Jan. 1946, page 21; July 1946, page 150.